Dec. 28, 1937.  E. R. MOTCH, JR., ET AL  2,103,486
ROTARY TOOL MACHINE
Filed Aug. 24, 1935   3 Sheets-Sheet 1

INVENTORS
Edwin R. Motch Jr. and
BY Johan Gustaf Moohl
Pays Oberlin & Pay
ATTORNEYS Dec. 28, 1937.  E. R. MOTCH, JR., ET AL  2,103,486
ROTARY TOOL MACHINE
Filed Aug. 24, 1935  3 Sheets-Sheet 2

INVENTORS
Edwin R. Motch Jr. and
BY Johan Gustaf Moohl
Bayf, Oberlin & Bayf
ATTORNEYS

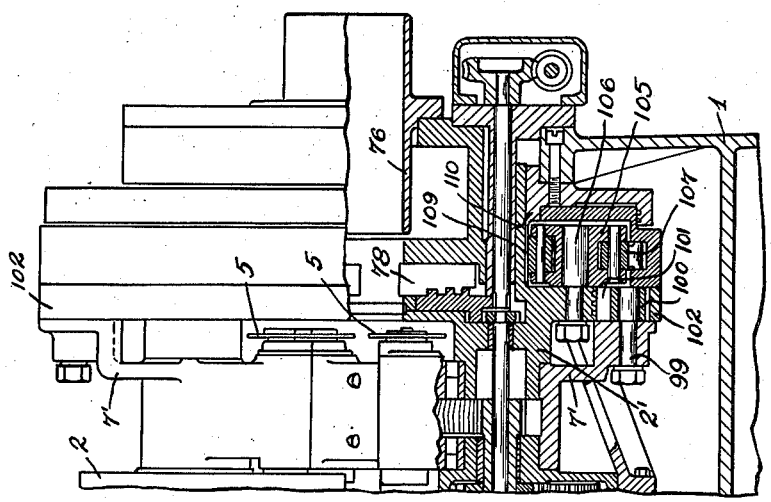
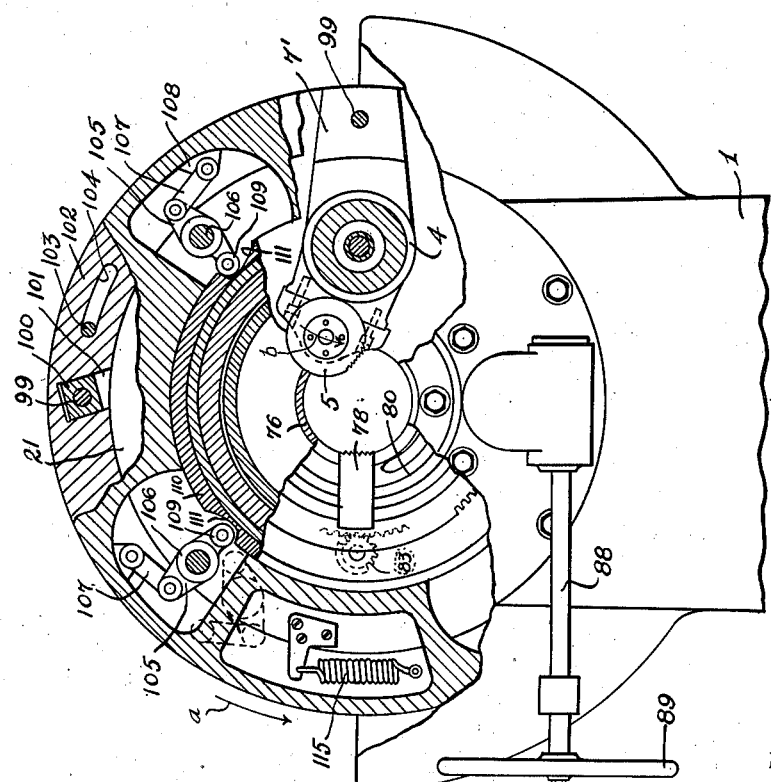

Patented Dec. 28, 1937

2,103,486

UNITED STATES PATENT OFFICE 2,103,486

ROTARY TOOL MACHINE

Edwin R. Motch, Jr., Cleveland, and Johan Gustaf Moohl, South Euclid, Ohio, assignors to The Motch and Merryweather Machinery Company, Cleveland, Ohio, a corporation of Ohio Application August 24, 1935, Serial No. 37,730

18 Claims. (Cl. 29—67)

The present invention relates to a machine for cutting, sawing, grinding and milling elongated workpieces such as tubes, bars, rods and shapes. More particularly the invention contemplates the provision of a series of rotary tools circumferentially positioned around the periphery of the workpiece and adapted to be fed in both centripetal and circumferential direction with respect to the workpiece. Another object of the invention is to provide means for automatically controlling and limiting the maximum force which is applied to the tool feeding mechanism in order to prevent injury to the tools or stalling of the machine when localized hard spots in the workpiece are encountered.

Still another object of the invention is to provide a workpiece holding mechanism comprising a double chuck whose jaws are positioned on either side of the point of operation of the series of rotary tools, and means for automatically operating such chuck jaws from a single point of control.

It is the general object and nature of the invention, particularly in the embodiment here illustrated and described, to provide a pipe or tube cut-off machine which will accomplish the cutting off operation with maximum efficiency in a minimum period of time and will produce a cut whose edges are free from any objectionable flash or burr. Additional objects and advantages of the invention shall become apparent as the following description proceeds.

To the accomplishment of the foregoing and related ends, said invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Figure 1:
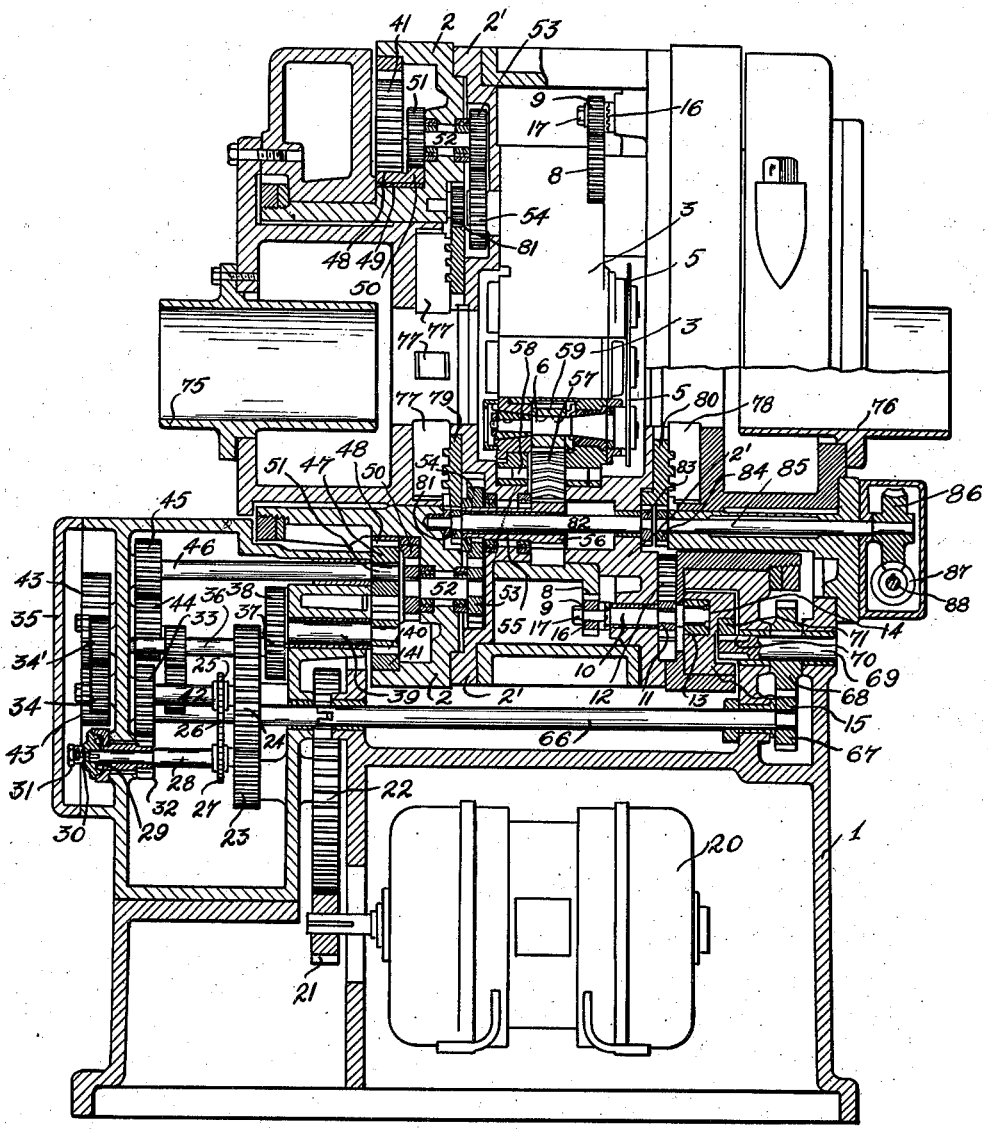
Figure 2:
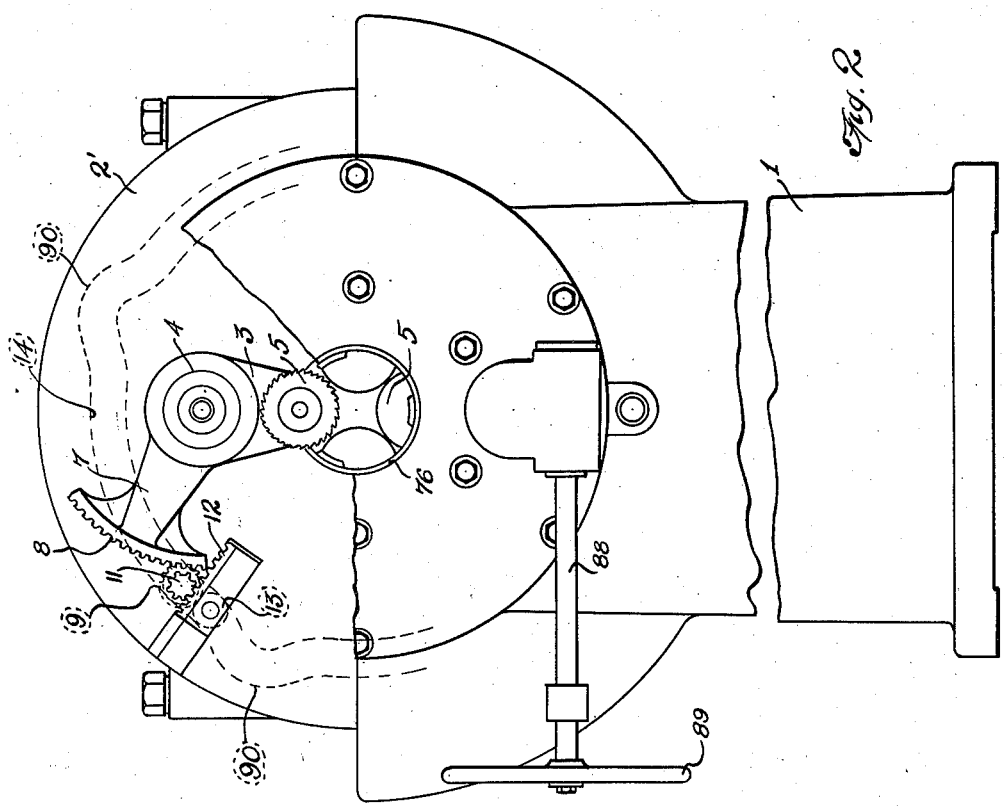
Figure 3:
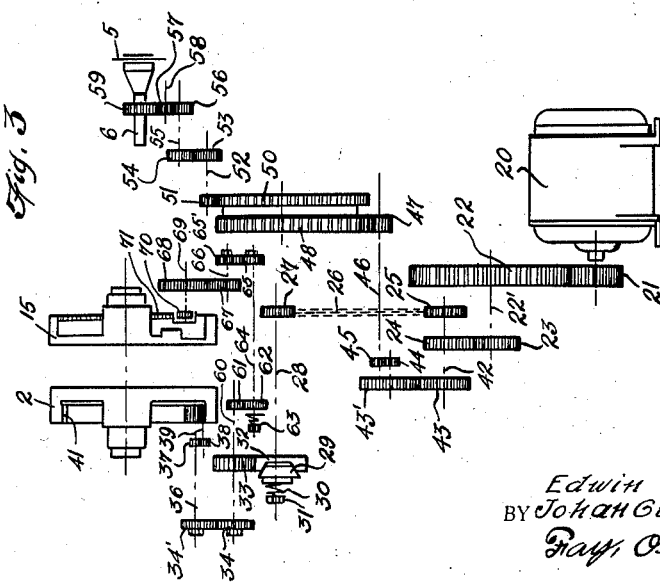

Fig. 1 is an elevational view, partially in section, illustrating a machine constructed in accordance with the principles of the invention; Fig. 2 is an end view, taken upon a plane normal to that of Fig. 1, of the right-hand end of the machine shown therein; Fig. 3 is a schematic representation of the gear trains illustrating the manner in which the driving power is transmitted to the various elements of the machine; Fig. 4 is a fragmentary elevational view, partially in section, illustrating an alternative form of construction of the rotary tool feed mechanism; and Fig. 5 is a view, with the various parts broken away and in section, of the alternative form of construction shown in Fig. 4 and taken upon a plane normal thereto.

Now referring more particularly to Figs. 1 and 2, the apparatus shown therein includes a machine base 1, upon which there is rotatably supported a face plate 2. For the purpose of convenience in construction and assembly, the face plate 2 is divided into the two portions 2 and 2' and the latter portion carries a series of pivoted arms 3 (which in the present embodiment are four in number) disposed at equal angular positions about the center thereof and pivoted at the point 4. The inner ends of the arms 3 carry the rotary tools 5 which in the present instance are in the form of circular saws. The equivalent forms of cutting tools or milling cutters, such as flat, angular or form milling cutters, or various forms of grinding wheels, may of course be substituted for the circular saws 5. The rotary tools 5 are carried on the outer ends of the horizontally disposed spindles 6 which are suitably journaled in the ends of the arms 3.

A second arm 7 is rigidly mounted with respect to the arm 3 about the pivot point 4 and carries on its outer end the gear segment 8 which in turn meshes with the pinion gear 9 mounted on the shaft 10. The shaft 10 is journaled in the face plate portion 2' and carries on its opposite end another pinion gear 11 which engages with the gear rack 12. The gear rack 12 is longitudinally slidable in a slot in the face plate 2' and has a laterally extending roller or cam follower 13 which extends into the cam track 14 of the cam plate 15. It will be noted that the pinion gear 9 is attached to the shaft 10 through the medium of the jaw clutch 16 and by loosening of the nut 17 on the end of the shaft 10, it is possible to adjust the position of the gear 9 on the shaft 10 and to thereby initially regulate the position of the pivoted arms 7 and 3.

The prime moving mechanism for driving the various parts of the machine consists of an electric motor 20 located in the bottom of the base 1. Directing attention conjointly to Figs. 1 and 3, the driving motor 20 is connected through the small gear 21 to the large gear 22 through the shaft 22' to the small gear 23. The gear 23 meshes with the gear 24 on the shaft 42. A sprocket gear 25, also mounted on the shaft 42, is connected through the chain 26 to a second sprocket gear 27 on the shaft 28. The shaft 28 carries a cone clutch 29 whose engagement pressure may be regulated by adjustment of the nut 31 against the compression spring 30. A small gear 32 constitutes the driven element of the clutch 29 and engages with the gear 33 on the shaft 60. The shaft 60 leads to the gears 34 and 34' which are accessible by removal of the cover plate 35 and may be interchanged with gears of a different ratio. The gear 34' is mounted upon the shaft 36 carrying the gear 37 which meshes with the gear 38 and shaft 39. The right-hand end of the shaft 39 carries the small gear 40 engaging with the internal gear ring 41 carried by the face plate 2.

By virtue of the last described gear train and through the gears and shafts in the order named, power is transmitted from the prime moving motor 20 to the face plate 2 and thereby produces rotation of the latter.

Driving power for the rotary tools 5 is transmitted through the following gear train: From the motor 20 through the gears 21, 22, 23, 24 to the shaft 42 which leads to the interchangeable gears 43 and 43'. The gear 43' is connected to the gear 44, meshing with the gear 45 on the shaft 46. The right-hand end of the shaft 46 carries a gear 47 meshing with one portion 48 of a double gear ring which is rotatably mounted upon the bearing 49. The other portion 50 of the double gear ring meshes with the planetary gears 51 on the shafts 52 carried by the face plate 2. The other end of the shaft 52 carries the gear 53 which in turn engages with the gear 54 mounted upon the hollow shaft or sleeve 55. The right-hand end of the hollow shaft 55 carries the gear 56 meshing with the gear 57 mounted upon the stub shaft 58. The gears 57 in turn engage with the gears 59 on the spindles 6 carrying the rotary tools 5. In this manner power is transmitted to the rotary tools 5 and even during their bodily rotation while carried by the face plate 2'.

The cam plate 15 is driven through the medium of the following gear train: Gear 61 mounted upon the shaft 60 (see Fig. 3) meshes with the gear 62 carrying the adjustable tension slip clutch 63 which is connected to the shaft 64. The shaft 64 leads to the interchangeable set of gears 65 and 65' to the shaft 66, which in turn carries upon its outer end the gear 67 meshing with the gear 68 mounted upon the shaft 69. The shaft 69 carries a small pinion gear 70 engaging with the external toothed gear ring 71 carried by the cam plate 15. In this manner power is transmitted from the driving motor 20 to the rotatable cam plate 15 and such power is limited as to its maximum application by virtue of the presence of the clutch 63 connected in the gear train.

In the foregoing descriptions of the several gear trains, some of the gears and shafts are not shown in Fig. 1 due to the fact that they are not located in the plane of the section of such figure. However, all gears and shafts are schematically represented in Fig. 3 and thereby sufficiently illustrate the continuity of the several gear trains in order to be comprehensive to any person skilled in the art.

The work holding mechanism consists of two fixed guide sleeves 75 and 76 attached to the frame or base 1 of the machine; and also includes a double set of chuck jaws 77 and 78 which are spaced on either side of the face plate 2'. The chuck jaws 77 and 78 engage with the spiral lands on the scroll plates 79 and 80. The outer periphery of the scroll plates 79 and 80 carry external gear teeth which mesh with the gears 81 and 83, respectively. The last two named gears are carried on opposite ends of the shaft 82 journaled in the face plate 2'. It will be seen that the shaft 82 also serves as a bearing support for the hollow shaft 55 in the rotary tool gear train. The scroll plate 80 carries a second external gear tooth portion which is engaged by the gear 84 on the end of the shaft 85. The shaft 85 is journaled in the base 1 and carries a worm wheel 86 engaging with the worm gear 87 on the shaft 88. The shaft 88 extends outwardly from the machine and carries a hand wheel 89. Thus, by rotation of the hand wheel 89, it is possible to rotate the scroll plate 80 and in turn the scroll plate 79 in the same direction through the gear 83, shaft 82 and gear 81. Any movement of the scroll plate 80 will thus be transmitted through the shaft 82 to movement in the same direction of the scroll plate 79. In this manner the chuck jaws 77 and 78 may be tightened and released. The scroll plates 79 and 80 will remain in locked position during rotation of the face plate 2' since the gears 81 and 83 walk around the periphery of the scroll plates 79 and 80, respectively, and the initial locking obtained by virtue of the worm wheel 86 and gear 87 is thereby transmitted to both of the scroll plates.

The operation of the above described machine is as follows: The tube or bar which is to be milled, cut or ground is gripped between the double set of chuck jaws 77 and 78. The rotary saws or tools 5 are placed in motion and simultaneously are fed inwardly with respect to the workpiece due to the rotation of the face plate 2 with respect to the cam plate 15, whereby the cam follower 13 moves past one of the lobes 90 of the cam track 14 and operates to pivotally move the tool carrying arm 3. Simultaneously the face plate 2' rotates about the workpiece and the tools 5 thus travel circumferentially as well as centrally with respect to the tube or bar which is to be cut. The relative speeds of the face plate 2' and cam plate 15 are such that the former will rotate through an angle greater than 90°, for example, about 95° about the workpiece during a single operation while the cam plate 15 will rotate only through a relatively small angle of about 5 or 10°, or a sufficient distance to carry the cam follower 13 through 90° with respect to the cam plate 15, i. e., down from one lobe 90 up to another lobe 90 of the cam track 14, while the face plate 2 rotates through more than 90°. The face plate is rotated through more than a 90° angle in order to insure an overlapping or overrunning of the cuts made by the individual cutting tools 5. The cam plate 15 is rotated at a fraction of the speed of the face plate 2 in order that the cam follower 13 will travel only 90° or from one lobe 90 to the other. In this manner the tools 5 are fed both inwardly and outwardly with respect to the workpiece during a single cycle of operation.

Due to the presence of the clutches 29 and 63, connected in the respective gear trains transmitting power to the face plate 2 and to the cam plate 15, the movement of these latter two elements will become temporarily arrested in the event that localized hardened areas are encountered in the workpiece or in the event too deep a cut is being taken. Either the face plate 2 or the cam plate 15 may individually have its movement arrested and the cutting progress of the tools 5 in either a circumferential or central direction will thus be temporarily retarded until the cutting impedance is overcome.

In the modified form of construction illustrated in Figs. 4 and 5, the separate driving means for the cam plate has been eliminated and rotation of the cam plate with respect to the face plate obtained by the utilization of a link mechanism. Referring more particularly to Figs. 4 and 5, the outwardly extending arms 7' of the rotary tool carrying arms 3 have the shafts 99 carrying the blocks 100. The blocks 100 are slidably movable in the radially inclined slots 101 of the cam plate 102. The inner ends of the bell crank arms 105 carry rollers 109 which are adapted to contact with the fixed cam track 110 having the depressions 111. The compression spring 115 connects the face plate 2' to the cam plate 102.

The operation of the above described alternative form of construction is as follows:—As the face plate 2' begins rotation in a counter-clockwise direction (see arrow $a$, Fig. 5) with respect to Fig. 5, the roller 109 rides against the shoulder of the recess 111 and thereby rotates the bell crank arm 105 about its pivot point 106. As the bell crank arm 105 thus rotates, the cam plate 102 is carried in a forward counter-clockwise direction with respect to the face plate 2'. As such forward movement of the cam plate 102 occurs, the block 100 will be moved inwardly in the slot 101 and the outer end of the arm 7' rotated in a counter-clockwise direction with respect to its pivot point 4 and thus move the rotary tool 5 inwardly with respect to the workpiece. That is, the tool 5 is swung inwardly in a direction opposite to the cutting direction or rotation of the face plate 2' (see arrow $b$ Fig. 5). The separate drive mechanism for the cam plate 102 is thus eliminated. The gear train and driving mechanism for the face plate 2' is, of course, the same as described in connection with the machine illustrated in Figs. 1, 2 and 3, and any impedance to cutting progress will be accommodated by the clutch 29. After the face plate 2' in the alternative form of construction shown in Figs. 4 and 5 has rotated through a ninety degree angle, the rollers 109 will again enter the recesses 111 and the force of the tension spring 115 will thus move the face plate 102 in a backward or clockwise direction with respect to the face plate 2' and thereby restore the rotary tools 5 to their starting position. It should be noted in the last described, alternative form of construction that it is not necessary to have the rotational movement of the tool 5 overrun, i. e., rotation through more than 90°. This is for the reason that the cutting tools 5, as they are finishing their cut, are swung outwardly in the same direction of movement as the rotation of the face plate 2' and thus their cutting paths are extended a short distance beyond the 90° rotation of the face plate 2'.

The double set of chuck jaws 77 and 78, disposed on either side of the point of application of the rotary tools, maintains the workpiece in proper position during the cutting or milling operation and prevents the weight of any portion of the workpiece from being exerted upon the weakened section from which metal has been removed.

Although the foregoing description particularly relates to the cutting of a tubular workpiece, it is equally well within the scope of our invention to apply its principle to the cutting, machining and grinding of tubes and bars having other than a circular cross-section such as square, rectangular, oval or irregularly shaped cross sections. In the event of the treatment of other than circular cross-sectioned workpieces, it is merely necessary to change the inward and outward movement of the rotary tools by the substitution of a suitable cam plate, the contour of whose cam surface conforms to the desired inward and outward movement of the rotary tools 5.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In a machine of the character described, the combination of work holding means, a series of rotary tools disposed exteriorly of the workpiece held in said work holding means, driving means for rotating said tools about their own axes and bodily around said work holding means, means for moving said tools inwardly with respect to the workpiece, and means for limiting the force applied to such inward movement of said tools.

2. In a machine of the character described, the combination of work holding means, a series of rotary tools disposed exteriorly of the workpiece held in said work holding means, driving means for rotating said tools about their own axes and bodily around said work holding means, means for limiting the amount of force applied to the bodily rotational movement of said tools, means for moving said tools inwardly with respect to the workpiece, and means for limiting the force applied to such inward movement of said tools.

3. In a machine of the character described, the combination of a pair of chucks mounted in spaced relationship, a rotatable member positioned between said chucks, a plurality of rotary tools carried by said rotatable member, said tools being movable towards and away from the center of said rotatable member, power means, transmission means connecting said power means to said rotatable member and to said tools, and means for moving said tools inwardly and outwardly with respect to said rotatable member during movement of the latter.

4. In a machine of the character described, the combination of a rotatable member, a plurality of arms pivotally mounted on said rotatable member, rotary tools carried by said arms, cam and lever means connected to said arms for controlling the pivotal movement of said arms during movement of said rotatable member, and driving means for rotating said rotatable member and for rotating said tools about their own respective axes.

5. In a machine of the character described, the combination of a pair of chucks mounted in spaced relationship, a rotatable member positioned between said chucks, a plurality of rotary tools carried by said rotatable member, power means, transmission means connecting said power means to said rotatable member and to said tools, and clutch means connected to said transmission means for limiting the amount of power applied to said rotatable member.

6. In a machine of the character described, the combination of a rotatable member, a plurality of arms pivotally mounted on said rotatable member, rotary tools carried by said arms, means for controlling the pivotal movement of said arms, driving means for rotating said rotatable member and for rotating said tools about their own respective axes, and means for limiting the amount of power applied to said rotatable member.

7. In a machine of the character described, the combination of a pair of spaced chucks, a rotatable member mounted between said chucks, scroll plates for moving said chucks, and means connecting said scroll plates to said rotatable member whereby movement of one scroll plate is transmitted to the other and movement of said rotatable member moves and holds said scroll plates to locked position.

8. In a machine of the character described, the combination of a pair of spaced chucks, a rotatable member mounted between said chucks, scroll plates engaging said chucks, a shaft carried by said rotatable member, epicyclic gears mounted on said shaft and engaging with the periphery of said scroll plates, and means for rotating one of said scroll plates.

9. In a machine of the character described, the combination of a pair of spaced chucks, a rotatable member positioned between said chucks, scroll plates engaging said chucks, a shaft carried by said rotatable member, epicyclic gears mounted on said shaft and engaging with the periphery of said scroll plates, means for rotating one of said scroll plates, a plurality of rotary tools carried by said rotatable member, power means, and transmission means connecting said power means to said rotatable member and to said tools.

10. In a machine of the character described, the combination of a rotatable member, a plurality of arms pivotally mounted on said rotatable member, rotary tools carried by said arms, a second rotatable member, means connecting said arms to said second rotatable member whereby the movement of the latter with respect to said first named rotatable member operates to pivotally move said arms, and driving means for rotating said rotatable members and for rotating said tools about their own respective axes.

11. In a machine of the character described, the combination of a rotatable member, a plurality of arms pivotally mounted on said rotatable member, rotary tools carried by said arms, a second rotatable member, a cam track in said second rotatable member, cam followers in said track connected to said arms, and means for moving said second rotatable member with respect to said first named rotatable member whereby said arms are pivotally moved.

12. In a machine of the character described, the combination of a rotatable member, a plurality of arms pivotally mounted on said rotatable member, rotary tools carried by said arms, a second rotatable member, means connecting said arms to said second rotatable member whereby the movement of the latter with respect to said first named rotatable member operates to pivotally move said arms, driving means for rotating said rotatable members and for rotating said tools about their own respective axes, and means for limiting the power applied to said rotatable members.

13. In a machine of the character described, the combination of a rotatable member, a plurality of arms pivotally mounted on said rotatable member, rotary tools carried by said arms, a member concentric with said rotatable member and movable with respect thereto, means connecting said arms to said concentric member whereby movement of the latter with respect to said rotatable member operates to pivotally move said arms, link mechanism connecting said concentric member to said rotatable member, and a stationary member contacted by said link mechanism and having raised portions for actuating said link mechanism and correspondingly moving said concentric member with respect to said rotatable member.

14. In a machine of the character described, the combination of work holding means, a series of rotary tools disposed exteriorly of the workpiece held in said work holding means, driving means for rotating said tools about their own axes, and automatically movable supporting means carrying said tools and operable to move them inwardly in a radially inclined direction with respect to the center of the workpiece during their operation.

15. In a machine of the character described, the combination of work holding means, a series of rotary tools disposed exteriorly of the workpiece held in said work holding means, driving means for rotating said tools about their own axes, means carrying said tools and operable to move them bodily around said work holding means, and automatically movable supporting means carrying said tools and operable to move them inwardly in a radially inclined direction with respect to the center of the workpiece during their bodily movement.

16. In a machine of the character described, the combination of work holding means, a series of rotary tools disposed exteriorly of the workpiece held in said work holding means, driving means for rotating said tools about their own axes and bodily around said work holding means, means for moving said tools inwardly in a radially inclined direction with respect to the center of the workpiece during their bodily rotation, and means for limiting the amount of force applied to the bodily rotational movement of said tools.

17. In a machine of the character described, the combination of work holding means, a series of rotary tools disposed exteriorly of the workpiece held in said work holding means, said tools being spaced at equal circumferential distances from each other, driving means for rotating said tools about their axes, means for moving said tools bodily about said work holding means, and means for feeding said tools inwardly with respect to said workpiece during their initial bodily movement and outwardly after bodily movement through an angular distance substantially equal to the distance between each of said tools.

18. In a tube or pipe cutting machine, the combination of work holding means, a series of rotary cutting tools mounted in a common radial plane and spaced at equal circumferential distances from each other, driving means for rotating said cutting tools about their own axes, means for feeding said tools inwardly a sufficient distance to cut through the wall of said tube or pipe, and means for bodily moving said tools in a path in said common plane and circumferentially with respect to said tube or pipe for a distance substantially equal to the distance between each of said tools.

EDWIN R. MOTCH, Jr.
JOHAN GUSTAF MOOHL.